United States Patent
Fisher et al.

(10) Patent No.: US 7,362,777 B2
(45) Date of Patent: Apr. 22, 2008

(54) CONCATENATED TRANSMISSION OF SYNCHRONOUS DATA

(75) Inventors: Douglas Fisher, Reading (GB); Nigel Bragg, Cambridgeshire (GB); Robert Friskney, Essex (GB); Nigel Baker, Essex (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1017 days.

(21) Appl. No.: 10/185,135

(22) Filed: Jun. 27, 2002

(65) Prior Publication Data

US 2004/0001519 A1   Jan. 1, 2004

(51) Int. Cl.
*H04J 3/24* (2006.01)

(52) U.S. Cl. .................................................. 370/473

(58) Field of Classification Search ........ 370/542–544, 370/473
See application file for complete search history.

(56) References Cited

U.S. PATENT DOCUMENTS

| | | | | |
|---|---|---|---|---|
| 5,065,396 A | * | 11/1991 | Castellano et al. | 370/536 |
| 5,293,378 A | * | 3/1994 | Shimizu | 370/474 |
| 5,781,527 A | * | 7/1998 | Read et al. | 370/216 |
| 6,640,023 B2 | * | 10/2003 | Miller et al. | 385/17 |
| 6,731,656 B1 | * | 5/2004 | Slater et al. | 370/536 |
| 6,901,082 B1 | * | 5/2005 | Purse | 370/535 |
| 6,931,009 B1 | * | 8/2005 | Agarwal | 370/395.1 |
| 6,961,350 B1 | * | 11/2005 | Bendak et al. | 370/474 |
| 2002/0001308 A1 | * | 1/2002 | Heuer | 370/386 |
| 2002/0012141 A1 | * | 1/2002 | Traverso | 359/124 |
| 2003/0007519 A1 | * | 1/2003 | Murton et al. | 370/539 |

OTHER PUBLICATIONS

Shi, G. et al., "SDH Virtual Concatenation Technique Used in Ethernet Data Transport," Jun. 2002.*
ITU-T, Network Node Interface for Synchronous Digital Hierarchy (SDH), Nov. 2001, 14 pages.

* cited by examiner

*Primary Examiner*—Doris H. To
*Assistant Examiner*—Kerri M Rose
(74) *Attorney, Agent, or Firm*—Barnes & Thornburg LLP (57) ABSTRACT

A multiplexed frame based client signal comprising a payload and a client overhead is transported between first and second client networks over a plurality of signal paths by inverse multiplexing the client signal into a plurality of lower rate signals each containing a respective payload and client overhead; attaching a carrier overhead to each said lower rate signal; transmitting the lower rate signals over the plurality of paths from the first client network to the second client network; and, at the second network, discarding the carrier overhead from each lower rate signal, and reassembling the lower rate signals so as to recover the client signal. The method enables bandwidth trading utilising virtual concatenation of synchronous optical channels, such that transparent transmission of a customers signals over any variety of intermediate networks can be achieved without requiring that the intermediate networks support virtual concatenation.

21 Claims, 5 Drawing Sheets

CONCATENATED TRANSMISSION OF SYNCHRONOUS DATA

FIELD OF THE INVENTION

This invention relates to methods and apparatus suitable for the concatenation and transmission of data over synchronous data networks such as synchronous optical networks (SONET) and synchronous digital hierarchy (SDH) networks.

BACKGROUND OF THE INVENTION

SONET/SDH networks have since their introduction in the early 1990's achieved widespread acceptance and widespread usage. The networks transmit data by encoding the data into well defined frame structures, containing a header and a payload, and then transmitting the data in the frame in a predetermined serial fashion.

The introduction of the SONET/SDH standards has allowed network operators to assume a reasonable degree of interoperability between different vendors and thus the standards are used almost exclusively for all fibre-based broadband networks. However, an operator may wish to operate a network based on the SONET or SDH standards with several geographically dispersed networks. For example, an operator may have a network covering a city (city A) which it wishes to interconnect with a similar network covering a distant second city (city B). For such an operator, the provisioning of a dedicated SONET or SDH fibre link between the two cities may be prohibitably expensive and/or not Justifiable in terms of potential bandwidth usage.

A typical solution to this problem is to utilise the business model of "bandwidth trading". In this business model, the operator approaches a third party (a bandwidth trader) to buy bandwidth on a fibre link which already exists between the two cities. The bandwidth trader may be a third party carrier, leasing out excess capacity. Alternatively, the bandwidth trader could be a dedicated broker of bandwidth, acting as an intermediately between those operators with excess capacity and those operators in need of extra capacity. In such an instance, the fibre link which exists between the two cities/geographically dispersed networks may not be owned by a single operator, but may comprise sections of fibre owned by different operators. In principle, this approach of bandwidth trading should be effective. However, analysis shows that there are drawbacks with the prior art implementations of such an approach.

It is desirable that a connection between the different geographically spaced networks is entirely transparent, so that it appears as if the network elements in the two separate regions are directly connected over fibre. Unfortunately, present solutions do not optimally meet this need. SONET and SDH do not offer complete transparency. They transport the payload transparently across an individual network, but the overhead (header information) is terminated at each node in the network. In practice, many operators use "spare" overhead bytes to perform critical proprietary tasks in their system, which means that when an overhead is terminated at the edge of that operator's network, any proprietary information that is carried is lost. Thus, for the above example in which an operator has two geographically separated networks, connected by a different vendors SONET (or SOH) equivalent, neither separate network has full visibility of the other network as the spare overhead bytes utilised by the operator will be terminated at the edge of the operator's networks, and replaced by the overhead utilised by the provider of the intermediate link(s).

A prior art approach to this problem is to utilise a digital wrapper. In such a scheme, the complete overhead and payload from a first network is wrapped up as the payload of the frame used for intermediate transmission, with an additional overhead added for control of the intermediate routing. Whilst retaining the complete original header and payload information, this approach has the disadvantage that the overall frame size is increased. Additionally, the channel must be sent at the line rate even if that means lower utilisation of the line bandwidth and higher average cost per bit.

SDH/SONET signals are transmitted at standard line rates. For example, an OC-192 or STM-64 signal is transmitted at approximately 10 Gigabits per second, an OC-48 (or STM-16) signal at approximately 2.5 Gigabits per second, an OC-12 (STM-4) at approximately 0.62 Gigabits per second and an OC-3 (STM-1) signal at 0.155 Gigabits per second. These transmission rates are determined by the transmission hardware, and so to increase a transmission rate would require a substantial upgrade in network hardware.

It can be desirable to transmit relatively high line rate signals over lower bit rate transmission lines e.g. a 10 Gigabit signal over a 2.5 Gigabit transmission line. Various solutions have been proposed as to how this can be achieved, with the common theme being that the higher bit rate signal is inverse multiplexed onto a concatenation of a number of channels at the lower bit rate.

For instance, U.S. Pat. No. 5,710,650 (Dugan) teaches a system in which a high data rate OC-192 signal is inverse multiplexed into four lower rate OC-48 signals which are transported through respective parallel channels (optical wavelengths). Such a concatenation scheme is termed a contiguous concatenation scheme, as it requires that contiguous wavelength channels are utilised.

Currently, many older networks exist that operate at relatively low line rates. Unfortunately, only a limited number of such networks allow concatenation of signals to allow higher line rates to be utilised, with the transmission of these signals being point to point Additionally, many networks do not incorporate hardware within the network so as to allow the transparent transmission of other vendors signals.

It Is an object of the present invention to overcome or at least to mitigate the problems of the prior art.

SUMMARY OF THE INVENTION

In a first aspect the present invention provides a method of preparing traffic for routing across an optical communications network, the method comprising the steps of: receiving at least one data signal; inverse multiplexing said received data signal into multiple data streams, each data stream being arranged for separate onward transmission through the different nodes of a communications network.

By preparing the traffic routing in this manner, the individual channels can be treated as individual signals and passed and multiplexed separately through a communications network. This allows relatively large bandwidth signals to be routed independently across different nodes of the network (or even of different networks) making best possible use of the available channels. Additionally, due to the granularity of the signals, hit-less switching can be achieved i.e. if the route of one channel goes down, the channel can easily be switched to another route with the majority of the channels being unaffected.

Preferably, the method further comprises the step of combining a plurality of received data signals into a high bit rate signal, said high bit rate signal being inverse multiplexed.

The method effectively combines virtual concatenation with an optical cross-connect to facilitate bandwidth trading. Virtual concatenation is used to map client bandwidth including overhead data into the payloads of multiple SONET/SDH transport channels maintaining overhead transparency of the client channel. The optical cross-connect assigns the multiple SONET/SDH transport channels to available bandwidth from carriers, and can distribute the multiple SONET/SDH payloads among multiple paths and a plurality of carriers. At the receiving end, a similar optical cross-connect redirects the multiple SONET/SDH payloads into a single virtual concatenation re-assembly point.

According to another aspect of the invention there is provided a method of transporting a multiplexed frame based client signal comprising a payload and a client overhead between first and second client networks over a plurality of signal paths, the method comprising the steps of: inverse multiplexing the client signal into a plurality of lower rate signals each containing a respective payload and client overhead; attaching a carrier overhead to each said lower rate signal; transmitting the lower rate signals over the plurality of paths from the first client network to the second client network; and, at the second network, discarding the carrier overhead from each lower rate signal, and reassembling the lower rate signals so as to recover the client signal.

Any range of one or more data signals can hence be utilised in accordance with the present invention, including, but not limited to SONET, SDH, Gigabit Ethernet, fibre channel and Escon. Such signals can be mapped into the payload of SONET or SDH in such a way that the original format overhead and timing can be recovered as the receiver.

Preferably, the overhead of the received data signals is retained within the multiple data streams.

In a second aspect the present invention provides a set of virtually concatenated synchronous optical communications signals, said signals being arranged for independent routing across the nodes of an optical network.

In a third aspect the present invention provides a method of receiving a set of virtually concatenated synchronous optical communications signals, said signals being arranged for independent routing across an optical network and containing an original data signal, the method comprising the steps of receiving said signals, and recreating the original data signal from said concatenated signals.

According to another aspect of the invention there is provided A method of transporting a multiplexed frame based client signal comprising a payload and a client overhead between first and second client networks over a plurality of signal paths, the method comprising the steps of; inverse multiplexing the client signal into a plurality of lower rate signals each containing a respective payload and client overhead; attaching a carrier overhead to each said lower rate signal; transmitting the lower rate signals over the plurality of paths from the first client network to the second client network; and, at the second network, discarding the carrier overhead from each lower rate signal, and reassembling the lower rate signals so as to recover the client signal.

As the signals are processed to allow independent routing across the whole optical network, only a single reassembly step is required at the destination point of the concatenated signal, rather than at each node within the network.

Preferably, a photonic switch connected to the communications network, and arranged to at least one of: switch outgoing virtually concatenated signals between different channels of at least one communications network; and switch incoming virtually concatenated signals from different channels of at least one communications network to a unit arranged to multiplex said concatenated channels.

The optical cross-connect can thus be used to assign the multiple SONET/SDH transport channels to available bandwidth from one or more different carriers. If necessary, individual channels can be sent along separate paths, or indeed over multiple paths in different networks.

Preferably, the node further comprises buffering means for buffering the concatenated signals, such that any difference in transmission times for the individual signals can be equalised.

In a further aspect the present invention provides a method of providing a bandwidth trading service to an operator, the method comprising the step of selling virtually concatenated synchronous optical channels to a customer, the individual channels being arranged for separate onward transmission through different nodes of a communications network.

In a further embodiment, a method and apparatus suitable for improving the liquidity of the service provided for Bandwidth Trading are provided The method includes the Bandwidth Trader utilising virtual concatenation of synchronous optical channels, such that transparent transmission of a customers signals over any variety of intermediate networks can be achieved, without requiring that the intermediate networks support virtual concatenation.

By utilising such a concatenation scheme, the commodity being sold by the bandwidth trader (i.e. available bandwidth) is made as liquid as possible. The commodity may be utilised in the smallest possible units (i.e. line rates), with such units being combinable with units of similar or greater size to provide any overall unit desired by the customer, making most effective use of all available channels irrespective of whether they exist on the same or different intermediate networks.

Preferably, the method further comprises the steps of: receiving a data signal sent by an operator; inverse multiplexing the received signal into said virtually concatenated channels; transmitting the concatenated channels across at least one network, said network comprising a number of nodes; receiving the concatenated channels at a single node; and recreating the data signal from said received concatenated channels.

Preferably, at least one concatenated channel takes a different route across the network than the other concatenated channels.

BRIEF DESCRIPTION OF THE DRAWINGS

Other aspects and features of the present invention will become apparent to those ordinary skilled in the art upon a review of the following description of the specific embodiment of the invention in conjunction with the accompanying drawings in which.

DESCRIPTION OF THE PREFERRED EMBODIMENT

Figure 1:
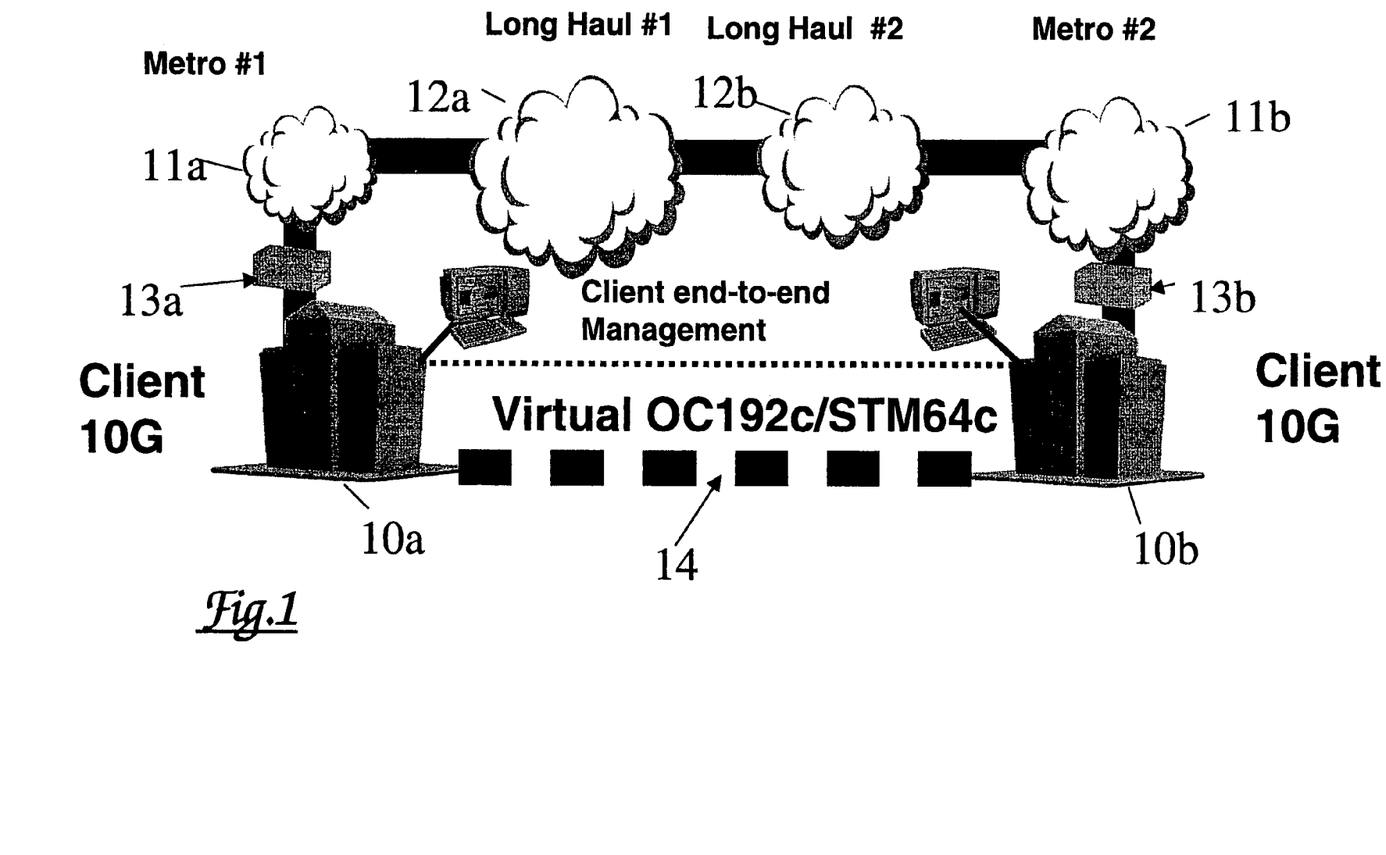
FIG. 1 is a schematic diagram of two physically separated synchronous networks interconnected by two different intermediate networks.

As shown in FIG. 1, two synchronous, e.g. OC192 networks 10A, 10B owned by the same client are physically separated. A physical path is provided between the client networks 10a, 10b via a first metro network 11a, one or more long haul networks 12a, 12b and a second metro network 11b. The intermediate networks 11, 12 operate at a lower line rate than the networks 10a, 10b (i.e. at OC12 rather than OC192). By providing a first virtual concatenation adapter 13a to the client network 10a, and a second virtual concatenations adapter 13b connected to the client network 10b, the two networks 10a, 10b can be transparently connected using the intermediate networks effectively providing a virtual OC912/STM64 connection 14.

Figure 2:
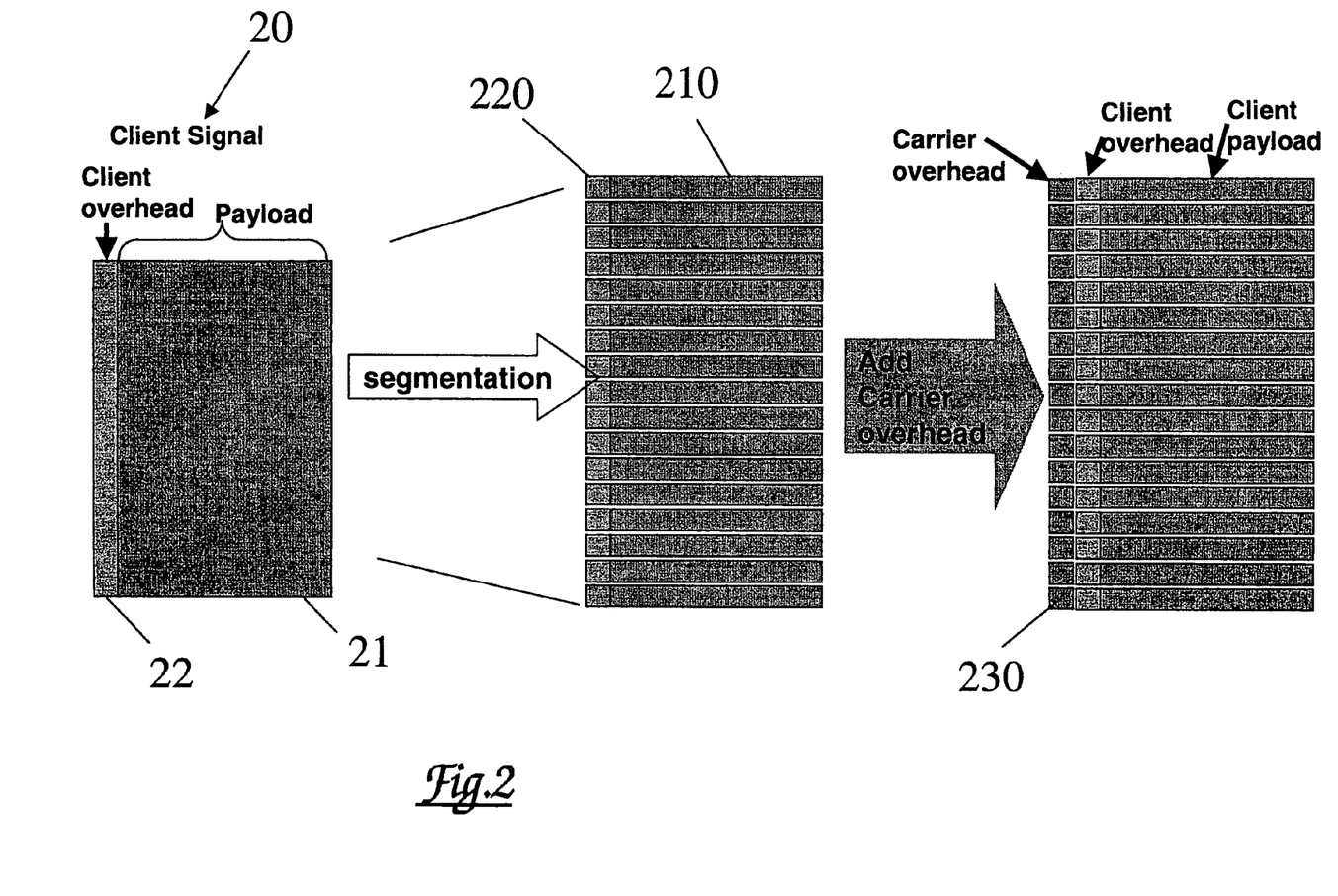
FIG. 2 illustrates the virtual concatenation process employed in the network of FIG. 1

FIG. 2 illustrates the virtual concatenation process. The client signal 20 (e.g. an OCM192/STM64 signal) comprising a payload 21 and a client overhead 22 is segmented into seventeen lower rate (e.g. OC12/STM4) channels each comprising a respective payload 210 and client overhead 220. each of these lower rate signals is then provided with a respective carrier overhead 230 for transmission over the carrier network to which that particular signal has been allocated. It will be appreciated that, for the purposes of transmission over the carrier network, the client overhead is treated as part of the payload and is thus transported transparently from end to end. At the receiving end, the carrier overhead is discarded and the client signal, including the client overhead, is reassembled. The reassembly process requires buffering to compensate for the path length differences and a knowledge of which channels are being reassembled.

The provision of this transparent virtual connection between the client networks enables both networks to be managed as a single entity.

Figure 3:
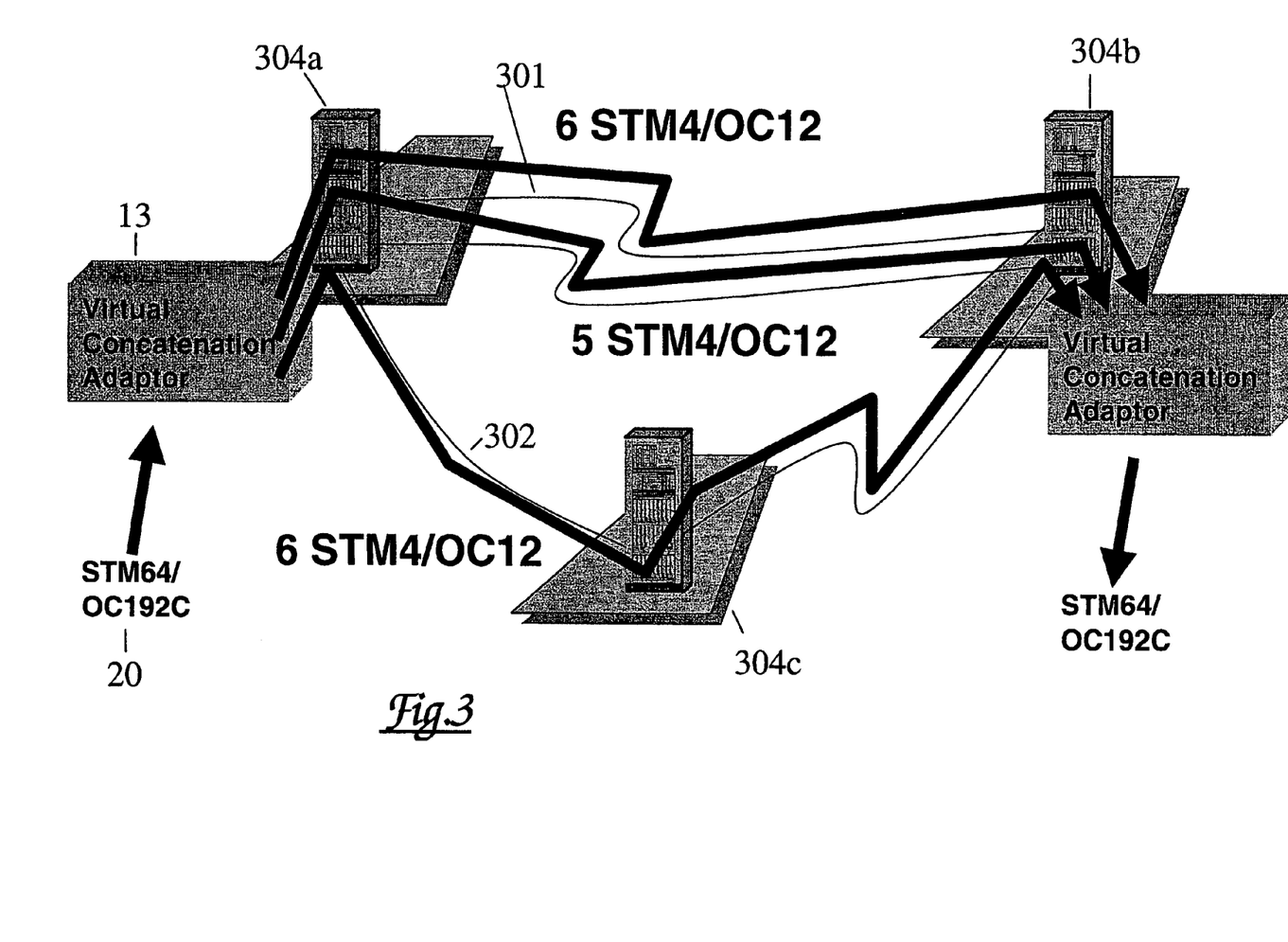
FIG. 3 shows the transmission process in more detail.
Figure 4:
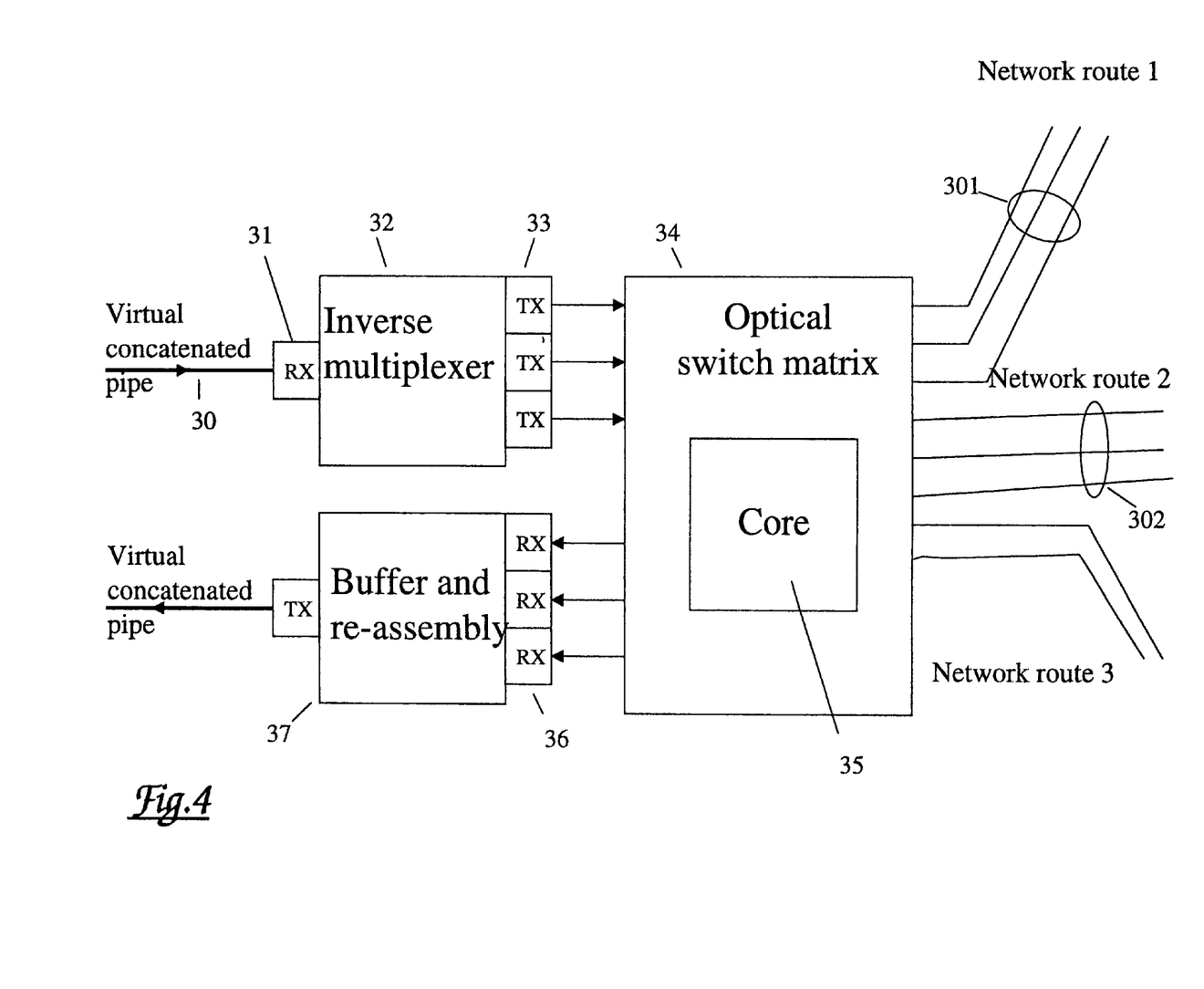
FIG. 4 is a schematic diagram of a photonic switch employed in the network arrangement of FIG. 1.

Referring now to FIG. 3, this illustrates the virtual concatenation and transmission process in more detail, Each virtual concatenation adapter 13 includes a photonic switch, in the form of an optical cross connect 34 (FIG. 4) with an electrical core 35. Such a switch can, once the original signal from the respected network e.g. 10a has been placed into lower bit rate virtually concatenated channels, be used to distribute the different channels (comprising multiple SONET/SDH payloads) along multiple paths 301, 302 and multiple carriers. Although FIG. 3 shows only two such paths, it will be appreciated that a wider choice of paths and carriers will generally be available. The equivalent optical cross connect at the virtual concatenation adapter 13b is then used to redirect the multiple SONET/SDH payloads into a single virtual concatenation reassembly point, for reassembly and passing to the other network 10b.

Virtual concatenation is defined by ITU standard G707. Such a scheme is used to divide the higher line rate SONET/SDH signal into multiple SONET/SDH concatenated signals of lower bandwidth. As discussed above, STM64/OC192 can be bundled into seventeen STM4/OC12 channels. By utilizing the cross connects within the virtual concatenation adapters, such lower line rate channels may be utilized even if they are non adjacent, and can be along different paths. In the example shown in figure 3, six channels are transmitted from node 304a via node 304c to node 304b, whilst eleven channels are transmitted directly from node 304a to node 304b. At each of these nodes, the carrier overhead will be stripped off and replaced, but the client overhead is treated as payload and thus remains intact. The photonic cross connects thus allow a potential for traffic balancing across the different routes within the intermediate networks, and also for maximizing the available line utilization. This reduces the requirement for grooming, and can be used to avoid disruption of live traffic that is already being transmitted on any given route.

Referring again to FIG. 4, this shows the functionality of the virtual concatenation adapter. The client STM64/OC192 signal is input on path 30 via receiver 31 to inverse multiplexer 32 which segments the signal e.g. into seventeen STM4/OC12 signals. The segmented signals are then fed via respective transmitters 33 to the switch matrix 34 which routes each signal on to the appropriate output path 301, 302. In the reverse direction, the incoming segmented traffic is routed via the switch 34 and receivers 36 to a buffer and reassembly unit 37. The carrier overhead is discarded prior to the reassembly process so that the recovered client signal includes the original client overhead which has been effectively transported as payload.

The segmentation and reassembly of the client STM64/OC192 signal may be performed under the control of software in machine readable form on a storage medium.

Figure 5:
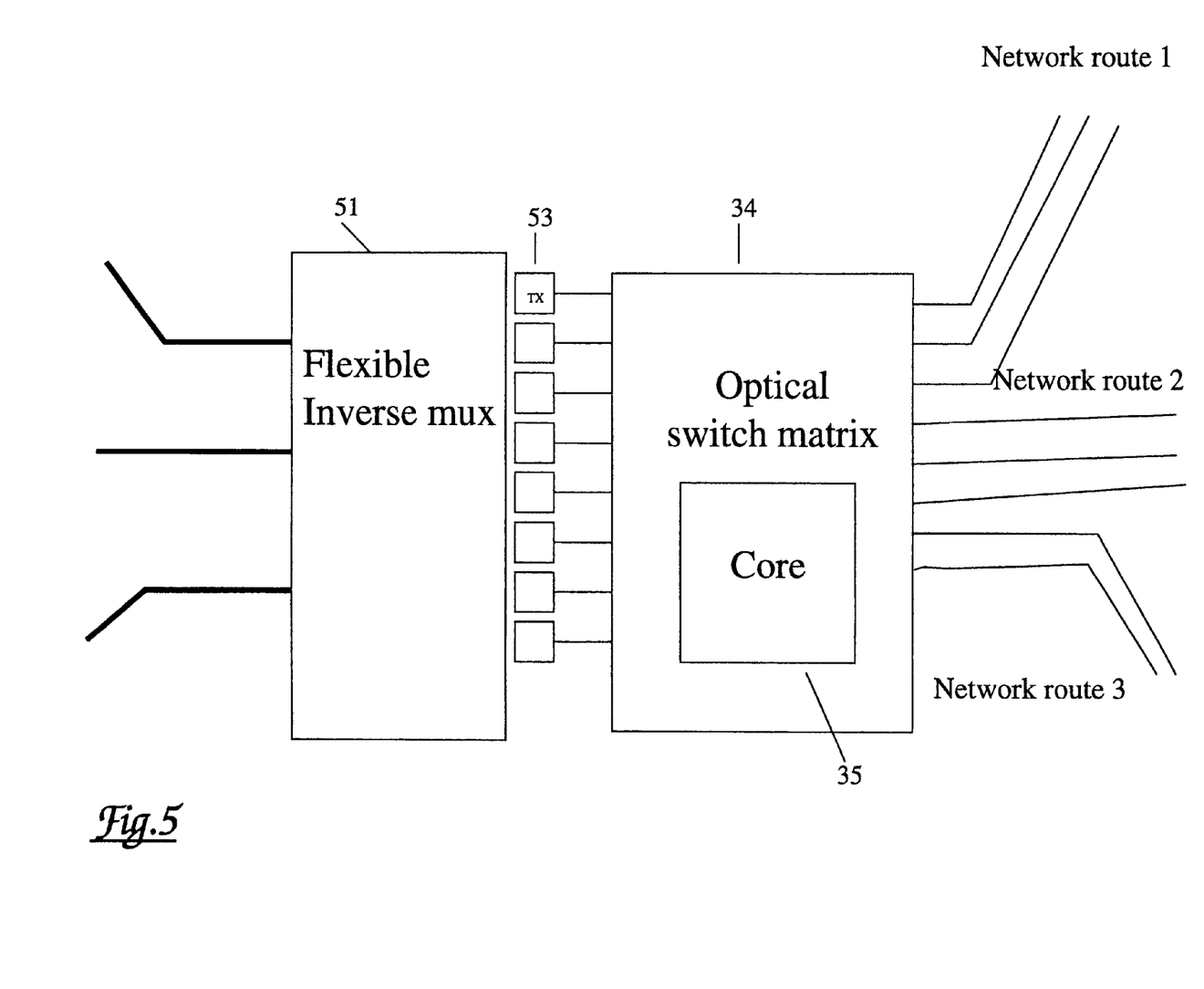
FIG. 5 shows the construction of a bandwidth trading hub.

In a further embodiment, as illustrated in FIG. 5, the virtual concatenation adapters is a, 13b can each take the form of a bandwidth trading hub which comprises a flexible inverse multiplexer 51 coupled via transmitters 53 to the photonic switch 34. Such a hub can be used to connect client bandwidth requirements of multiple service types (e.g. SONET/SDH, Gigabit Ethernet, Fibrechannel, Escon formats etc) to multiple carriers, preferably into SONET or SDH payloads in such a way as to preserve format overhead and timing which is recoverable at the far end. Virtual concatenation (as described by ITU G707) or arbitrary concatenation can be used to divide the SONET/SDH concatenated signal into multiple SONET/SDH concatenated signals of lower bandwidth. In the bandwidth trading hub arrangement of FIG. 5, the pipes can be variable and there is an opportunity to select which network routes are used on the basis of cost. In the preferred embodiment, the signal is transmitted at the smallest possible granularity, i.e. the lowest common denominator of line rates, along the different paths. It can be used to provide a uniform and complete SONET/SDH overhead transparency independent of SONET/SDH equipment transparency schemes that may exist in the intermediate networks. It can thus provide tolerance to multiple carrier line rates including line rates less than the desired service data rate for the customer, tolerance to the carrier ability to TDM multiplex the client bandwidth for greater bandwidth efficiency. The trading code can thus produce to in parallel and/or sequentially stitched together bandwidth of a uniform granularity (e.g. line rate) from multiple carriers and so provide a uniform unit of bandwidth within the carrier independent of client service requirements and means of service performance monitoring Thus a bandwidth trader utilising virtual concatenation of synchronous optical channels, allows the transparent transmission of a customer signal over any variety of intermediate networks to be achieved, without requiring that the intermediate networks support virtual concatenation An arbitrary level of improved resiliency to failure can be achieved by providing a 1:N sparing arrangement. If for example four diversely routed primary 2.5 Gbps channels are concatenated to form a 10 Gbps channel, one more 2.5 Gps channel can be provided to protect against a single failure. This provides a useful level of protection for much lower cost than having a spare 10 Gbps connection. Alternately, a hitless protection scheme can be provided in which one or more channels cover each of the individual channels with the virtual concatenation adapter providing the synchronisation and control. This also allows the improvement of BER, as any frames discarded from one link can generally be obtained from its spare.

If a packet link between is carried between the adapters, e.g. a 10 Gbps Ethernet access port, this would allow the expansion and contraction of the amount of capacity allocated to that link on demand. E.g. during the daytime, 8×STM-4s could be concatenated to give ~5 Gbps whereas during nighttime, seven of them could be turned off (by the end user) without breaking connectivity. The end applications don't need to be adjusted as they will just see it as a more congested link and back off their own usage. In a bandwidth market scenario, where payment is costed per minute, this is more valuable than in the usual situation in which capacity is being saved on one operator's network.

It will be understood that the above description of a preferred embodiment is given by way of example only and that various modifications may be made by those skilled in the art without departing from the spirit and scope of the invention.

The invention claimed is:

1. A method of transporting a client data signal in a plurality of lower bit rate carrier paths across an optical communication network, the method comprising the steps of:
   receiving at least one client data signal;
   segmenting said received client data signal into a plurality of lower bit rate data signals, each lower bit rate data signal comprising a portion of payload and a portion of client overhead of the client data signal, said segmenting comprising inverse multiplexing said client data signal into said plurality of lower bit rate data signals;
   attaching to each of said lower bit rate data signals carrier overhead;
   transmitting the plurality of lower bit rate signals over said plurality of carrier paths;
   discarding the carrier overhead from each of said plurality of lower bit rate signals; and
   reassembling the plurality of lower bit rate signals so as to recover the client signal, said reassembling comprising multiplexing said plurality of lower bit rate data signals to recover said client data signal;
   wherein the method comprises preparing said client data signal for transmission from a first network of a client operator to a second network of said client operator across a plurality of lower bit rate paths of an independently operated carrier network.

2. The method as claimed in claim 1, wherein said client data signal and said plurality of lower bit rate data signals are synchronous data signals.

3. The method as claimed in claim 1, wherein the client data signal is a multiplexed frame based signal.

4. The method as claimed in claim 3, wherein the client data signal is a SONET/SDH signal.

5. The method as claimed in claim 1, wherein the step of segmenting comprises inverse multiplexing said client data signal into a set of virtually concatenated synchronous optical communication signals.

6. The method as claimed in claim 5, wherein the step of inverse multiplexing said client data signal into a set of virtually concatenated synchronous optical communication signals comprises photonically switching outgoing virtually concatenated signals between the plurality of lower bit rate carrier paths in the optical communication network.

7. The method as claimed in claim 5, further comprising buffering the set of virtually concatenated synchronous optical communication signals such that any difference in transmission times for the individual signals can be equalized.

8. The method of claim 1, wherein the plurality of lower bit rate data signals are independently routed across the carrier network.

9. A method of preparing a client data signal to be transported in a plurality of lower bit rate carrier paths across an optical communication network, the method comprising the steps of:
   receiving said at least one client data signal;
   segmenting said received client data signal into a plurality of lower bit rate data signals, each lower bit rate data signal comprising a portion of payload and a portion of client overhead of the client data signal, said segmenting comprising inverse multiplexing said client data signal into said plurality of lower bit rate data signals; and
   attaching to each of said lower bit rate data signals carrier overhead;
   wherein the method comprises preparing a client data signal for transmission from a first network of a client operator to a second network of said client operator across a plurality of lower bit rate paths of an independently operated carrier network.

10. A method of recovering a client data signal transported in a plurality of lower bit rate carrier paths across an optical communication network, the method comprising the steps of:
    receiving said plurality of lower bit rate data signals, each lower bit rate data signal comprising a portion of payload and a portion of client overhead of the client data signal and having carrier overhead attached thereto;
    discarding the carrier overhead from each of said plurality of lower bit rate signals; and
    reassembling the plurality of lower bit rate signals so as to recover the client signal, said reassembling comprising multiplexing said plurality of lower bit rate data signals to recover said client data signal;
    wherein said client data signal is received from a first network of a client operator at a second network of said client operator having been transmitted across a plurality of lower bit rate paths of an independently operated carrier network.

11. An optical communication network for transporting a client data signal in a plurality of lower bit rate carrier paths across the network, the network comprising:
    a first node for receiving said at least one client data signal;
    inverse multiplexing means at said first node for segmenting said received client data signal into a plurality of lower bit rate data signals, each lower bit rate data signal comprising a portion of payload and a portion of client overhead of the client data signal, said segmenting comprising inverse multiplexing said client data signal into said plurality of lower bit rate data signals, said node being arranged to attach to each of said lower bit rate data signals carrier overhead;
    a plurality of carrier paths for transporting said plurality of lower bit rate signals;
    a second node for receiving said plurality of tower bit rate signals and discarding the carrier overhead from each of said plurality of lower bit rate signals; and multiplexing means at said second node for reassembling the plurality of lower bit rate signals so as to recover the client signal, said reassembling comprising multiplexing said plurality of lower bit rate data signals to recover said client data signal;

wherein said first node comprises a node in a first network of a client operator, said second node comprises a node in a second network of said client operator and said first and second networks are connected by an independently operated carrier network which comprises the plurality of lower bit rate paths for transporting said plurality of lower bit rate signals.

12. The network as claimed in claim 11, wherein said network is a synchronous data network.

13. The network as claimed in claim 11, wherein the network is a multiplexed frame based network.

14. The network as claimed in claim 13, wherein the network is a SONET/SDH network.

15. The network as claimed in claim 11, wherein the inverse multiplexing means is arranged to inverse multiplex said client data signal into a set of virtually concatenated synchronous optical communication signals.

16. The network as claimed in claim 15, wherein the inverse multiplexing means is arranged to inverse multiplex said client data signal into a set of virtually concatenated synchronous optical communication signals by photonically switching outgoing virtually concatenated signals between the plurality of lower bit rate carrier paths in the optical communication network.

17. The network as claimed in claim 15, further comprising buffering means for buffering the set of virtually concatenated synchronous optical communication signals such that any difference in transmission times for the individual signals can be equalized.

18. The network as claimed in claim 11, wherein it comprises a first network and a second network for transporting the client data signal, said first and second networks being operated by a client operator and a carrier network comprising the plurality of lower bit carrier paths independently operated by a carrier network operator.

19. A node for preparing a client data signal to be transported in a plurality of lower bit rate carrier paths across an optical communication network, the node comprising:
  means for receiving said at least one client data signal;
  means for segmenting said received client data signal into a plurality of lower bit rate data signals, each lower bit rate data signal comprising a portion of payload and a portion of client overhead of the client data signal, said segmenting comprising inverse multiplexing said client data signal into said plurality of lower bit rate data signals; and
  means for attaching to each of said lower bit rate data signals carrier overhead;
  wherein said means for segmenting and attaching are arranged to prepare a client data signal for transmission from a first network of a client operator to a second network of said client operator across a plurality of lower bit rate paths of an independently operated carrier network.

20. A node for recovering a client data signal transported in a plurality of lower bit rate carrier paths across an optical communication network, the node comprising:
  means for receiving said plurality of lower bit rate data signals, each lower bit rate data signal comprising a portion of payload and a portion of client overhead of the client data signal and having carrier overhead attached thereto;
  means for discarding the carrier overhead from each of said plurality of lower bit rate signals; and
  means for reassembling the plurality of lower bit rate signals so as to recover the client signal, said reassembling comprising multiplexing said plurality of lower bit rate data signals to recover said client data signal;
  wherein said node for recovering said client data signal comprises a node in a network of a client operator and is arranged to receive said client data signal from another node in another network of said client operator and wherein said network and said another network are connected by an independently operated carrier network which comprises the plurality of lower bit rate paths for transporting said plurality of lower bit rate signals.

21. A method of transporting a client data signal in a plurality of lower bit rate carrier paths across an optical communication network, the method comprising the steps of:
  receiving at least one client data signal;
  segmenting said received client data signal into a plurality of lower bit rate data signals, each lower bit rate data signal comprising some payload and some client overhead of the client data signal;
  attaching to each of said lower bit rate data signals carrier overhead;
  transmitting the plurality of lower bit rate signals over said plurality of carrier paths;
  discarding the carrier overhead from each of said plurality of lower bit rate signals; and
  reassembling the plurality of lower bit rate signals so as to recover the client signal;
  wherein the method comprises preparing a client data signal for transmission from a first network of a client operator to a second network of said client operator across a plurality of lower bit rate paths of an independently operated carrier network.

* * * * *